United States Patent
Behal et al.

(10) Patent No.: US 10,210,239 B2
(45) Date of Patent: Feb. 19, 2019

(54) SIMPLIFIED ENTITY RELATIONSHIP MODEL TO ACCESS STRUCTURE DATA

(71) Applicant: INTERNATIONAL BUSINESS MACHINES CORPORATION, Armonk, NY (US)

(72) Inventors: Amit Behal, San Jose, CA (US); Ying Chen, San Jose, CA (US); Bin He, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 963 days.

(21) Appl. No.: 14/044,781

(22) Filed: Oct. 2, 2013

(65) Prior Publication Data

US 2014/0032603 A1 Jan. 30, 2014

Related U.S. Application Data

(62) Division of application No. 12/715,997, filed on Mar. 2, 2010, now Pat. No. 8,572,124.

(51) Int. Cl.
*G06F 9/44* (2018.01)
*G06F 17/30* (2006.01)

(52) U.S. Cl.
CPC .......... *G06F 17/30604* (2013.01); *G06F 9/44* (2013.01); *G06F 17/30* (2013.01)

(58) Field of Classification Search
CPC ...... G06F 17/30604; G06F 9/44; G06F 17/30; G06F 17/30595; G06F 17/2785; G06F 17/30389
See application file for complete search history.

(56) References Cited

U.S. PATENT DOCUMENTS

| | | | |
|---|---|---|---|
| 5,448,726 A | | 9/1995 | Cramsie et al. |
| 5,659,723 A | * | 8/1997 | Dimitrios .................. G06F 8/24 |
| 7,523,133 B2 | * | 4/2009 | Mackie ............. G06F 17/30595 |
| | | | 707/104.1 |
| 8,010,909 B1 | | 8/2011 | Hanson et al. |
| 2005/0097108 A1 | | 5/2005 | Wang |
| 2007/0005583 A1 | | 1/2007 | Chau et al. |
| 2007/0299872 A1 | | 12/2007 | Bier |
| 2008/0133402 A1 | | 1/2008 | Kurian |
| 2008/0228812 A1 | | 9/2008 | Oglesby |
| 2009/0027392 A1 | | 1/2009 | Jadhav |

OTHER PUBLICATIONS

Chandra, AK; "Implementation of Conjunctive Queries in Relational Data Base", IPCOM000085384D-TDB 03-76 ; Mar. 1, 1976, p. 3520-3526.

(Continued)

*Primary Examiner* — James Trujillo
*Assistant Examiner* — Cheryl M Schechtman
(74) *Attorney, Agent, or Firm* — Shimokaji IP

(57) ABSTRACT

Modeling data as an undirected graph can include a set of entities and a set of attributes. A set of relationships can be defined to represent semantic associations with each association connecting at least two entities. Attributes can be associated with entities rather than with relationships. A hierarchical query language with a set of atomic operations on modeled data can be employed. The modeled data can be displayed on a display unit.

7 Claims, 17 Drawing Sheets

(56) References Cited

OTHER PUBLICATIONS

Markowitz, V.M.; Makowsky, J.A., "Identifying extended entity-relationship object structures in relational schemas", Software Engineering, IEEE Transactions on; vol. 16, Issue 8, Aug. 1990 pp. 777-790.
Nor IE, Moira C., "An Extended Entity-Relationship Approach to Data Management in Object-Oriented Systems" (1993); 12th Inti. Conf. on Entity-Relationship Approach. pp. 1-11.
Yefim Dinitz, Alek Vainshtein, "The connectivity carcass of a vertex subset in a graph and its incremental maintenance"; STOC '94: Proceedings of the twenty-sixth annual ACM symposium on Theory of computing; May 1994. pp. 716-725.
Gerd Schiffner and Peter Scheuermann; IPCOM000128154D: "Multiple views and abstractions with an extended entity relationship model"; Northwestern University, Dec. 31, 1979. pp. 1-13.
Carlo A. Curi No, Hyun J. Moon, Carlo Zaniolo; Graceful Database Schema Evolution: the PRISM Workbench; VLDB '08, Aug. 24-30, 2008, Auckland, New Zealand pp. 761-772.
Peter Pin-Shan Chen, "The Entity-Relationship Model-Toward a Unified View of Data", ACM Transactions on Database Systems, vol. 1, No. 1, Mar. 1976.
Stanley et al, 'S.E.A.L—A Query Language for Entity-Association Queries', 2009, 20th Australasian Database Conference, Wellington, New Zealand; pp. 67-76.
Parent et al, 'An Algebra for a General Entity-Relationship Model', Jul. 1985, IEEE Transactions on Software Engineering, vol. se-11 No. 7, pp. 634-643.

\* cited by examiner

1210 →
```
for each $std in Student
return {
sname,
avggrade as AVG($std/@Grade.grade)
}
```

This query can be decomposed into two steps:

1220 → 1) An entity aggregation on Student to compute the average grade for each student.

1230 → 2) A functional mergence of the Student entity set and the aggregtion entity set in step 1.

FIG. 12

The steps to process an SQuery

User input: An SQuery

1310 → step 1: Decompose Squery into a sequence of algebra operations. Each level in SQuery corresponds to one more one operations.

1320 → step 2: Process algebra operations sequentially. Operations corresponding to upper levels in Squery are processed before the ones in lower levels. Each operation adds one or more entity sets (or relationships) into the SER model being queried 1330 → step 3: Generate the output tree view by combining the new entity sets according to the hierarchy of the given SQuery

FIG. 13

User Input SQuery

1410 →
```
for each $std in Student
where $std/Grade[program="PhD"]
return {
   sname,
   for each $crs in $std/Course
   where $crs[cname like "EE%"]
   return as EECourse {
      cname
   }
}
```

1420 → Step 1: The query is decomposed into two operations

1430 → 1) Student2 = σ(this/Grade[program = "PhD"])Student
1440 → 2) EECourse = Πcname(σ(this[cname like "EE%"] and this/Student2)Course)

The first operation corresponding to level 1 of SQuery
The second operation corresponding to level 2 of SQuery

FIG. 14

SIMPLIFIED ENTITY RELATIONSHIP MODEL TO ACCESS STRUCTURE DATA

RELATED APPLICATIONS

The present divisional application claims benefit of U.S. application Ser. No. 12/715,997, filed on Mar. 2, 2010, which application is incorporated herein by reference in its entirety.

BACKGROUND OF THE INVENTION

The present invention relates generally to the field of modeling data, and more specifically, to modeling data as an undirected graph.

Retrieving sufficient insight from database data may be important to corporations. Today's database and content applications may construct sophisticated queries and provide results in a variety of views for satisfying business needs.

Today's data models include relational, XML and ER (Entity-Relationship) data models. The data models with their query languages have their various disadvantages.

With a relational model, logical concepts queried by users often may not map to the relational model's relations directly. The query and the result may be required to explicitly deal with inconsistencies between the logical view and physical relational record view and adjust their queries to be aligned with the relational model when querying and converting to a logical view when returning results.

An XML model may be designed for data that has inherent hierarchy and may be best suited for hierarchical data navigation. Such a model may be difficult to adapt to other query patterns without imposing significant query complexity.

ER data models have had some success in the system design area. The ER model may be overly complex to support simple and general purpose queries.

Hence, there is a need for a more efficient system and method for supporting a simplified entity relationship data model for simple and flexible query access to structured data.

SUMMARY OF THE INVENTION

According to one embodiment of the present invention, a method comprising: modeling data by representing semantic associations using predefined sets of entities, attributes and relationships, with each association connecting at least two entities, by processing the modeling of data into first modeled data using a computer with a computer processor; associating the predefined attributes with the predefined entities and not with the predefined relationships; employing a hierarchical query language with a set of atomic operations on the first modeled data, in which the atomic operations include at least one of the following: projection, selection, union, difference, distinction, aggregation, functional mergence, and relationship creation, and wherein the language supports at least one of closed query operations and cross-concept queries; and outputting the first modeled data in a visual form, including at least one of displaying the first modeled data on a display unit and printing out the first modeled data on a printer.

In another embodiment of the present invention, a system comprising: a computer including a computer processor for modeling data; a computer user interface for a user inputting a set of entities, inputting a set of attributes, and inputting a set of relationships to represent semantic associations, with each association connecting at least two entities; a data modeling engine for creating first modeled data using role names to represent different functions of entity sets in at least one relationship in the set of relationships, the data modeling engine employing a hierarchical query language with a set of atomic operations on the first modeled data, wherein the language supports at least one of closed query operations and cross-concept queries in which the atomic operations include at least one of the following: projection, selection, union, difference, distinction, aggregation, functional mergence, and relationship creation, wherein the aggregation is scalar aggregation; and a computer display for displaying the first modeled data on a display unit.

In another embodiment, a computer program product for modeling data, the computer program product comprising a computer readable storage medium having computer readable program code embodied therewith, the computer readable program code comprising: computer readable program code configured to create first modeled data by representing semantic associations using predefined entities, attributes, and relationships, with each of the associations connecting at least two entities; computer readable program code configured to create a partial relationship for one of the relationships with more than three entity sets; computer readable program code configured to employ a hierarchical query language with a set of atomic operations on the modeled data, in which the atomic operations include at least one of the following: projection, selection, union, difference, distinction, aggregation, functional mergence, and relationship creation, and wherein the language supports at least one of closed query operations and cross-concept queries; computer readable program code configured such that each of the atomic operations use a hierarchical path expression as an input parameter; computer readable program code such that the hierarchical path expression expresses a set of the predefined entities and their associations as a dynamic tree structure; and computer readable program code configured to output data in a visual form including displaying the first modeled data on a display unit.

These and other features, aspects and advantages of the present invention will become better understood with reference to the following drawings, description and claims.

BRIEF DESCRIPTION OF THE DRAWINGS

FIG. 12 shows an exemplary embodiment of the invention showing an example query with functional mergence;

FIG. 13 is a block diagram of an exemplary embodiment of the invention showing steps for processing an Squery;

FIG. 14 shows an example of the invention showing Squery decomposed into separate operations;

DETAILED DESCRIPTION OF THE INVENTION

Figure 1:
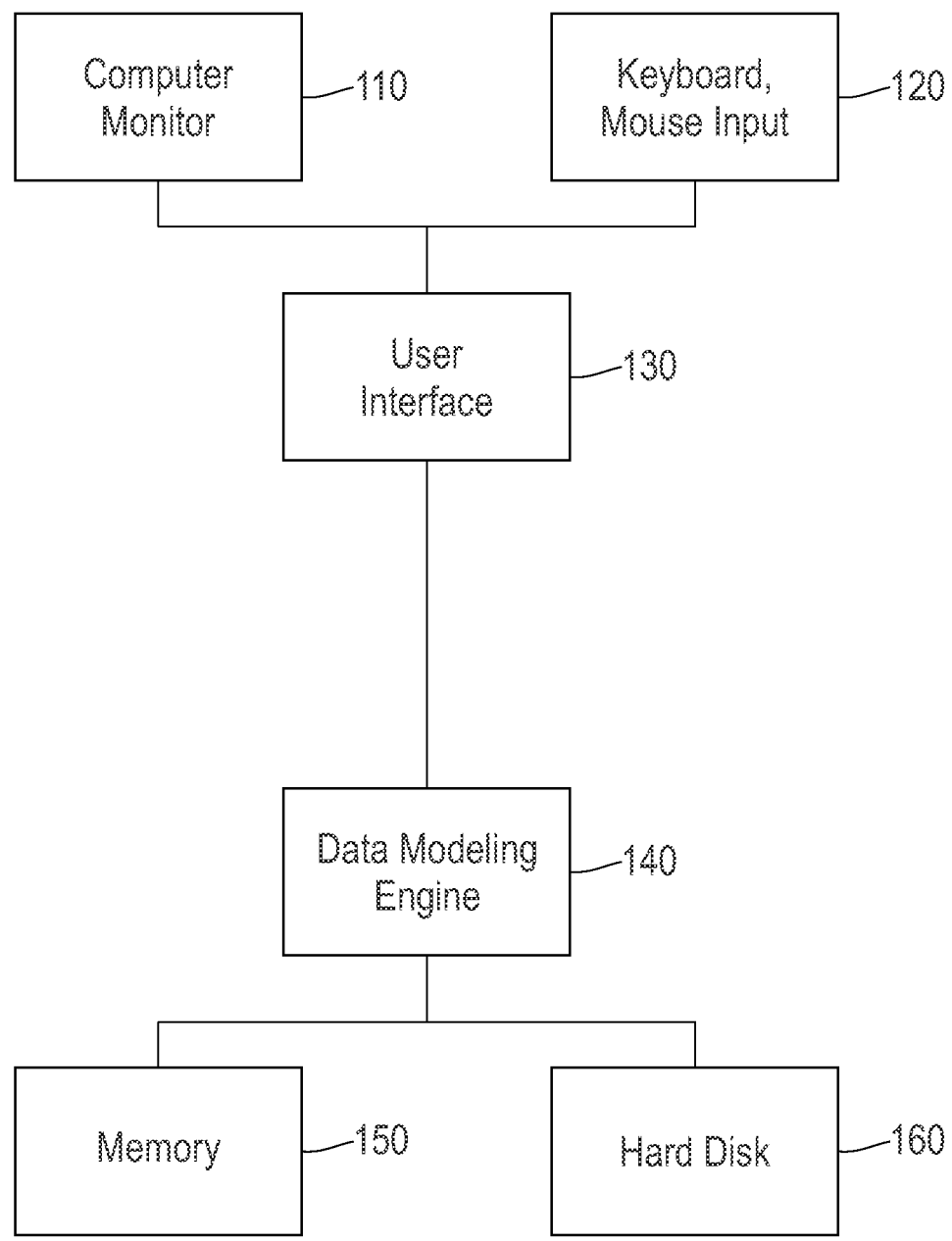
FIG. 1 is a block diagram of a system according to one exemplary embodiment of the invention.

The following detailed description is of the best currently contemplated modes of carrying out the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features. However, any single inventive feature may not address any of the problems discussed above or may only address one of the problems discussed above. Further, one or more of the problems discussed above may not be fully addressed by any of the features described below.

The present invention is a Simplified Entity Relationship (SER) Data Model that is in the field of data models. This data model may be used to predict new market opportunities.

The present invention may, in an exemplary embodiment simplify an ER (Entity Relationship) model in three ways. First, only entities may have attributes. Relationships may not have attributes. One of the complexities in using an ER model for querying purposes may be that both entities and relationships may have attributes. Users may need to identify attributes from both types of elements as part of the query inputs and result set. There may also be a need to have two sets of query operations, one operating on the entities and one on relationships. By eliminating attributes from relationships, only one set of query operations may be needed.

A second way in which the present invention may, in an exemplary embodiment, simplify an ER model, is that in contrast to a traditional ER model, there may be no need for role names. Role names in a traditional ER model may be used to represent different functions of entity sets in a relationship. For querying purposes, one may only need to know that there is a relationship between the entities. Such relationship may already be captured by the relationship names in the ER model. Even relationship names may not always be needed. For example, pseudo-code queries may not need role names and relationship names, and the relationship may be inherent through "/".

A third way in which the present invention may, in an exemplary embodiment, simplify an ER model, is that the present invention may allow partial relationship for relationship sets with more than three entity sets. The ER model does not provide for partial relationship sets with more than three entity sets. A set of relationships does not include at least one semantic association that could be included if the data were complete. For example, although a relationship set R may connect n entity sets, a particular relationship in R may only connect a subset of the n (at least 2) entities. For example, in a general example, every student may get a grade for a course the student took, but some students may not have grades for the courses the students took for various reasons. The relationships of those special cases may only connect student and course entities, with grade entities as NULL values. This may be needed to support real-world query cases where some entities in a relationship may be missing.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable mediums having computer-readable program code embodied therein.

Any combination of one or more computer readable medium(s) may be utilized. The computer readable medium may be a computer readable signal medium or a computer readable storage medium. A computer-readable storage medium may be, for example but not limited to, an electronic, magnetic, optical, electromagnetic, infrared, or semiconductor system, apparatus, device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer-computer-readable storage medium may be any tangible medium than can contain, or store a program for use by or in connection with an instruction performing system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction performing system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as JAVA (JAVA is a registered trademark of Sun Microsystems), Smalltalk, C++ or the like and conventional procedural programming languages, such as the "C" programming language or similar programming languages. The program code may perform entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which perform via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which perform on the computer or other programmable apparatus provide processes for implementing the functions/acts specified in the flowchart and/or block diagram block or blocks.

FIG. 1 is a block diagram of a data modeling system 100 according to an exemplary embodiment of the invention. The system 100 may include a computer monitor 110, a keyboard and mouse 120, a user interface 130, data modeling engine 140, memory 150, and a hard disk 160.

The user may utilize the invention by using the user interface 130 displayed on the computer monitor 110 and operating the user interface 130 with the keyboard and mouse 120. The user may utilize the data modeling system 100 by inputting data and functions from the user interface 130 for processing by the data modeling engine 140. The user interface 130 and the data modeling engine 140 may be stored in computer random access memory 150 and on a hard disk 160.

Figure 2:
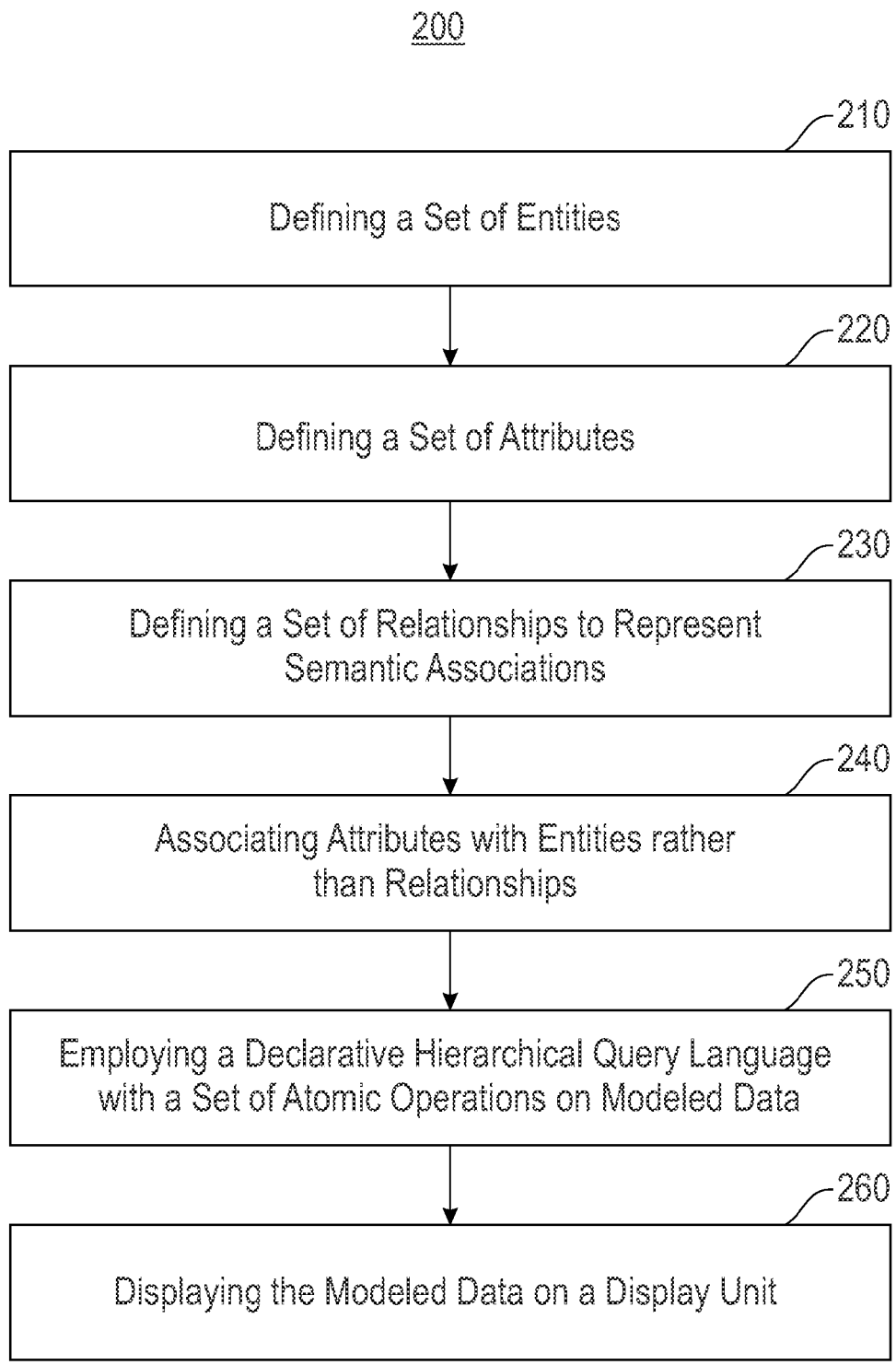
FIG. 2 is a flowchart of an exemplary embodiment of the invention.

FIG. 2 shows a flowchart of an exemplary embodiment of the invention 200. At block 210, a step of defining a set of entities may occur. Entities, for example such as students or courses, may be defined. At block 220, a step of defining a set of attributes may occur. Attributes may, for example, be a year a student is enrolled or a course grade. At block 230, a step of defining a set of relationships to represent semantic associations, with each association connecting at least two entities, may occur. A student, for example, may have a relationship with a course by being enrolled in the course. At block 240, a step of associating the attributes only with entities rather than with relationships, may occur. The present invention associates attributes with entities, not with relationships. An advantage of this is that by eliminating attributes from relationships, only one set of query operations may be needed. At block 250, a step of employing a declarative, hierarchical query language with a set of atomic operations on modeled data may occur. A query language of an exemplary embodiment of the invention may, for example, have query operations including a union of two entity sets or a difference of two entity sets. The query language may support queries involving multiple relationships and multiple entities. For example, a student may take a course and also be a teaching assistant of a course. Therefore, an entity student in an entity set of students may have a relationship of enrolling in a course entity and also the student may have a relationship of teaching assistant in another course entity in an entity set of courses. At block 260, a step of displaying the modeled data on a display unit, may occur. A display unit may, for example, be a computer monitor.

Figure 3:
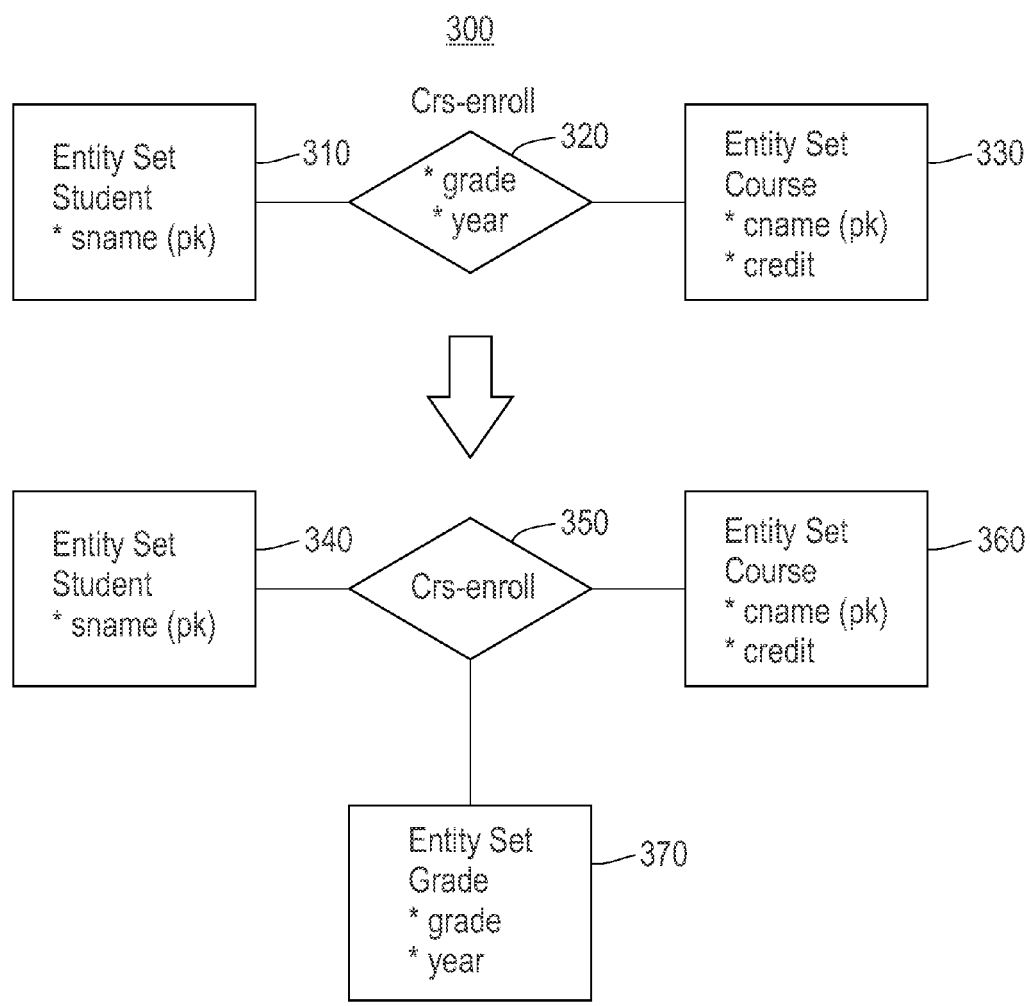
FIG. 3 is a flowchart showing the creation of an exemplary embodiment of the invention from an ER model.

FIG. 3 shows the creation of an exemplary embodiment of the present invention from an ER model Entity set Student at 310 and Entity set Course 330 may have the attributes of grade and year as shown at 320. An embodiment of the present invention may be created from an ER model by adding a new entity set Grade 370 to include the two relationship attributes "grade" and "year" as shown at block 370. The two relationship attributes "grade" and "year" may be removed from the relationship Crs-enroll 320, and the Entity set Grade 370 may be created with added attributes "grade" and "year". The relationship set Crs-enroll at block 350 is left without attributes, as it an aspect of the invention that relationships are not to have attributes, which may avoid duplication of the attributes in both a relationship set and an entity set. The resulting SER model according to an embodiment of the present invention may have three entity sets Student 340, Course 360, and Grade 370.

In the present invention, the use of a hierarchical language may support closed query operations. The query may be determined to be closed if the query result using an SER algebra can be incorporated into the present invention. The present invention may also support cross-concept querying. Cross concept querying involves multiple relations and may include one-to-many relationships such as one student to many courses.

Figure 4:
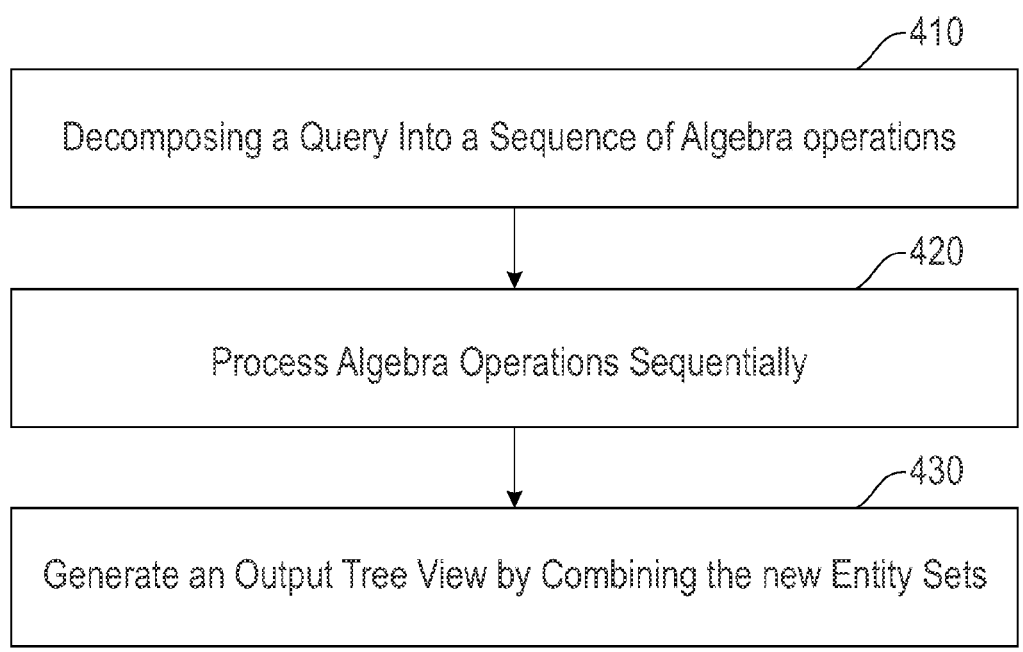
FIG. 4 is a flowchart of an exemplary embodiment of the invention showing steps for processing a query.

The cross-concept queries may, for example in an exemplary embodiment of the invention take the steps shown in FIG. 4. First, as shown at block 410, decomposing a query into a sequence of algebra operations may occur. Each level of a query may correspond to one or more operations. Next, as shown at block 420, processing algebra operations sequentially may occur. The algebra operations may, for example create a union of two entity sets, or create an aggregation of values in two entity sets. Then, as shown at block 430, generating an output tree view by combining newly created entity sets may occur.

The hierarchical language used in the present invention may include atomic operations including projection, selection, union, difference, distinction, aggregation, functional mergence, and relationship creation. These may be separate and distinct algebra operations and one or more of such operations may be used alone or in combination to compose more complex queries. The operations may be combined by outputting the result of a first operation into a second operation. For example, in an exemplary embodiment of the invention, the number of courses registered by students for a year may be retrieved. The distinction operation may be performed to retrieve a year entity set, and an aggregation operation may be combined with the result of the distinction operation to count an aggregation of the courses take during the year retrieved by the distinction operation. The first seven operations are entity operations in that they create a new entity as a query result. The last operation, "relationship creation", is a relationship operation.

In the present invention, the projection operation may build a new entity set by selecting a subset of attributes of an entity set. As an example, the entity sets T and E may have one-to-one mapping between entities. Each entity in T may be a projection of the corresponding entity in E on the attributes of E. T participates in all the relationships that E has.

Figure 5:
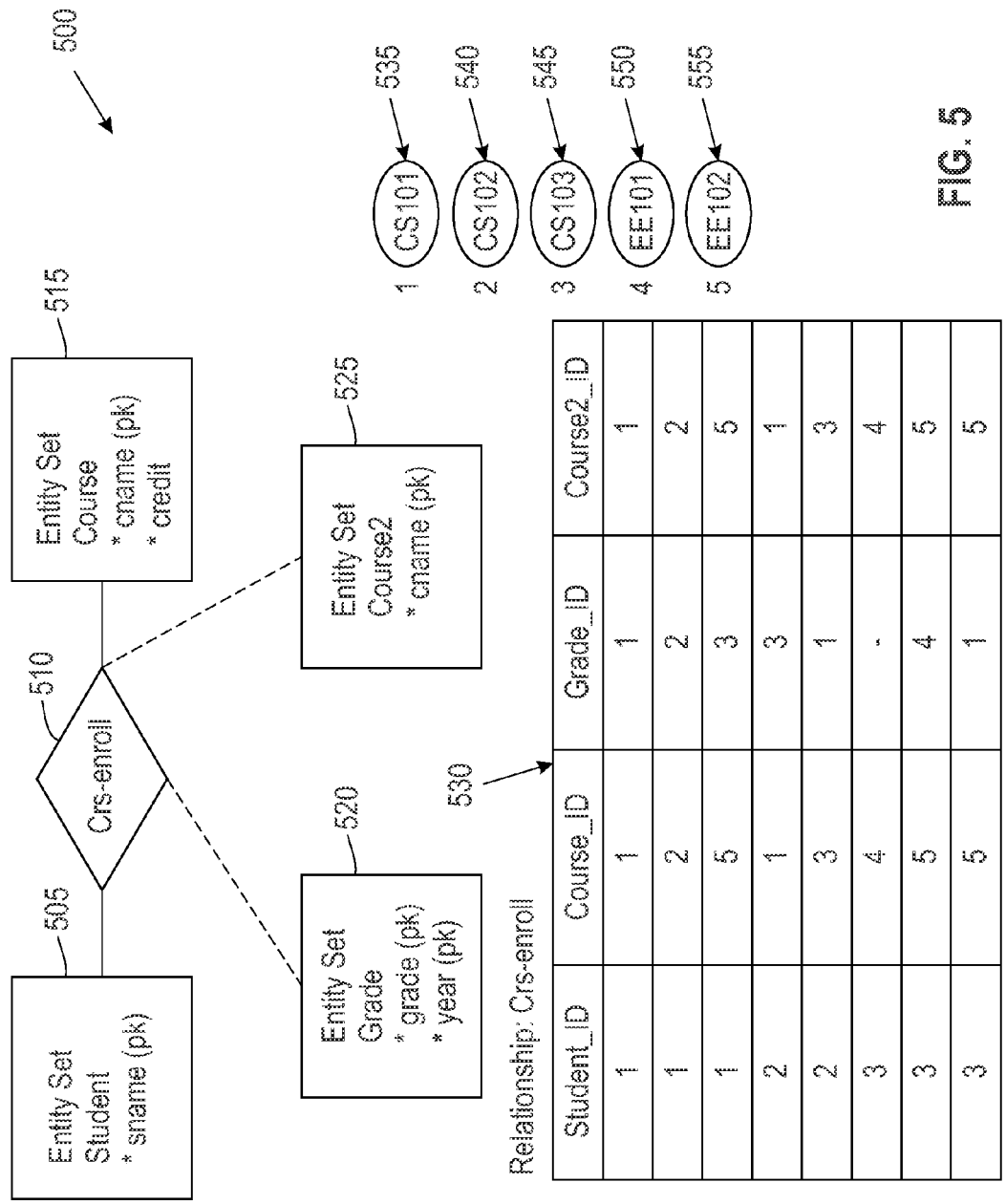
FIG. 5 is a block diagram of an exemplary embodiment of the invention after projection.

FIG. 5 is an exemplary embodiment of the projection operation in the present invention. FIG. 5 shows how the new entity set Course2 is a projection 500 of the entity set Course, and the new entity set Course2 may have the same linkage as the original entity set Course. The projection operation may build the new entity set Course2 525 by selecting the attribute crsname which may be a subset of the attributes of entity set Course 515. After projection, there may be four entities, Student 505, Grade 520, Course 515, and Course2 525. The courses are listed as CS101 (535), CS102 (540), CS103 (545), EE101 (550), and EE102 (555). A table of the values is shown at 530. The entities may have the relationship Crs-enroll, shown at 510. As the newly created entity set Course2 525 and the entity set Course 515 have the same attribute cname, the values for Course2 525 and Course 515 are the same in the table 530, which contains the course IDs 1-5 listed beside the course names CS101 (535), CS102 (540), CS103 (545), and EE101 (550), and EE102 (555).

In the present invention, the selection operation in a hierarchical language of the present invention may select a subset of entities of an entity set and put them into a new entity set. The operation may, for example, select entity subsets of an entity set in which the courses match the courses taken by a particular student.

Figure 6:
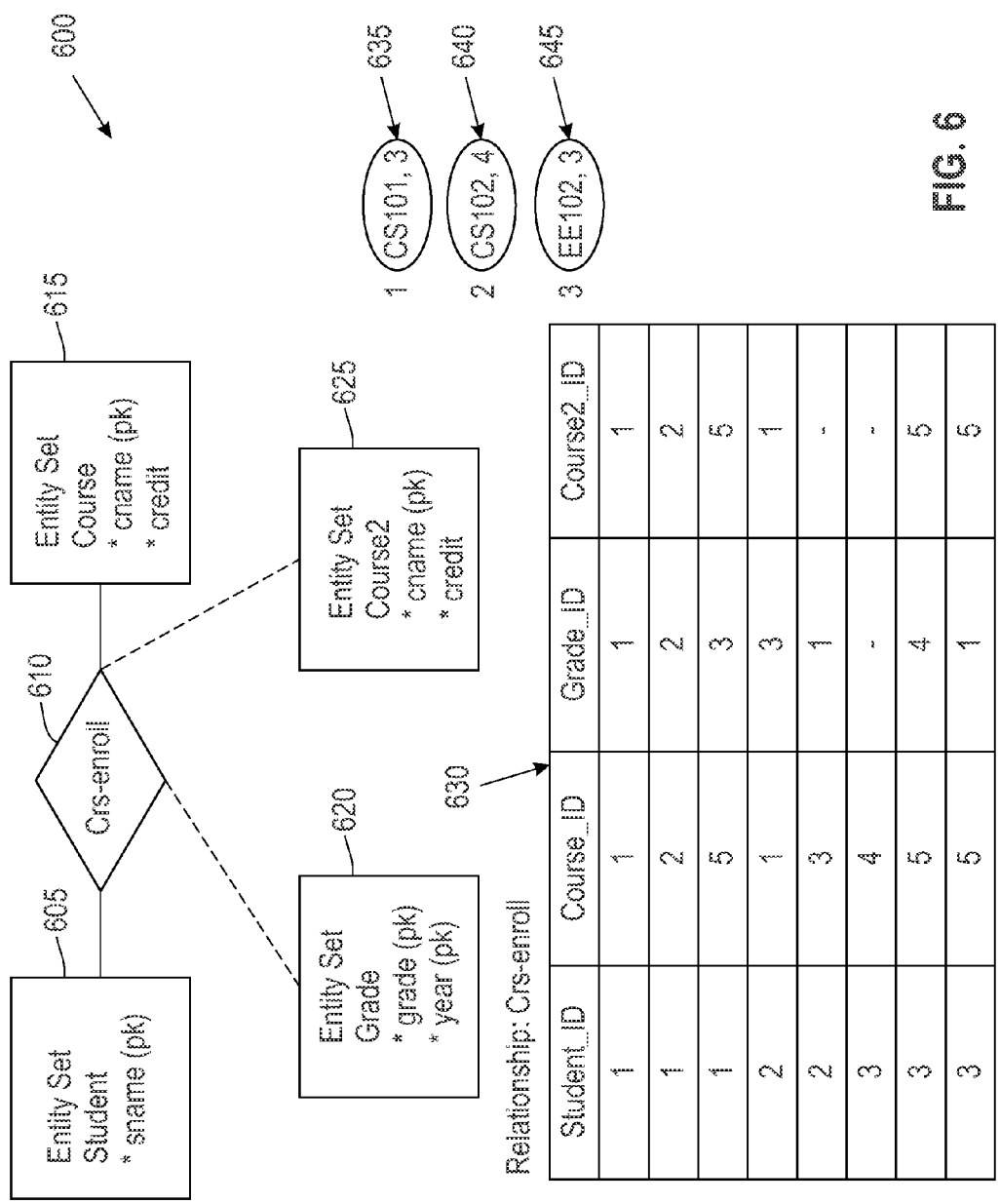
FIG. 6 is a block diagram of an exemplary embodiment of the invention after selection.

FIG. 6 is an exemplary embodiment of the selection operation in the present invention. FIG. 6 shows how the new entity set Course2 is a selection 600 of courses taken by a selected student entity 605. In the selection operation, the courses CS101 (635), CS102 (640), and EE102 (645) are selected and placed in new entity set Course2. After selection, there may be four entity sets: Student 605, Grade 620, Course 615, and Course2 625. As entity set Course2 625 may have the attributes cname and credit as shown at 625, the course CS101 (635) is listed as being a 3 credit course, with course ID "1". A table of the values is shown at 630. The entities may have the relationship Crs-enroll, shown at 610.

In the present invention, the union operation in a hierarchical language of the present invention may merge two entity sets into one by removing duplicates. Two entities forming a union may be derived from the same entity set and have the same attribute descriptions. For each relationship set that these entity sets participate in, their roles may be merged into a new role.

In the present invention, a difference operation in a hierarchical language of the present invention may generate a new entity set which is the difference of two given entity sets. The two entity sets may be originally derived from the same entity set and have the same attribute description.

Figure 7:
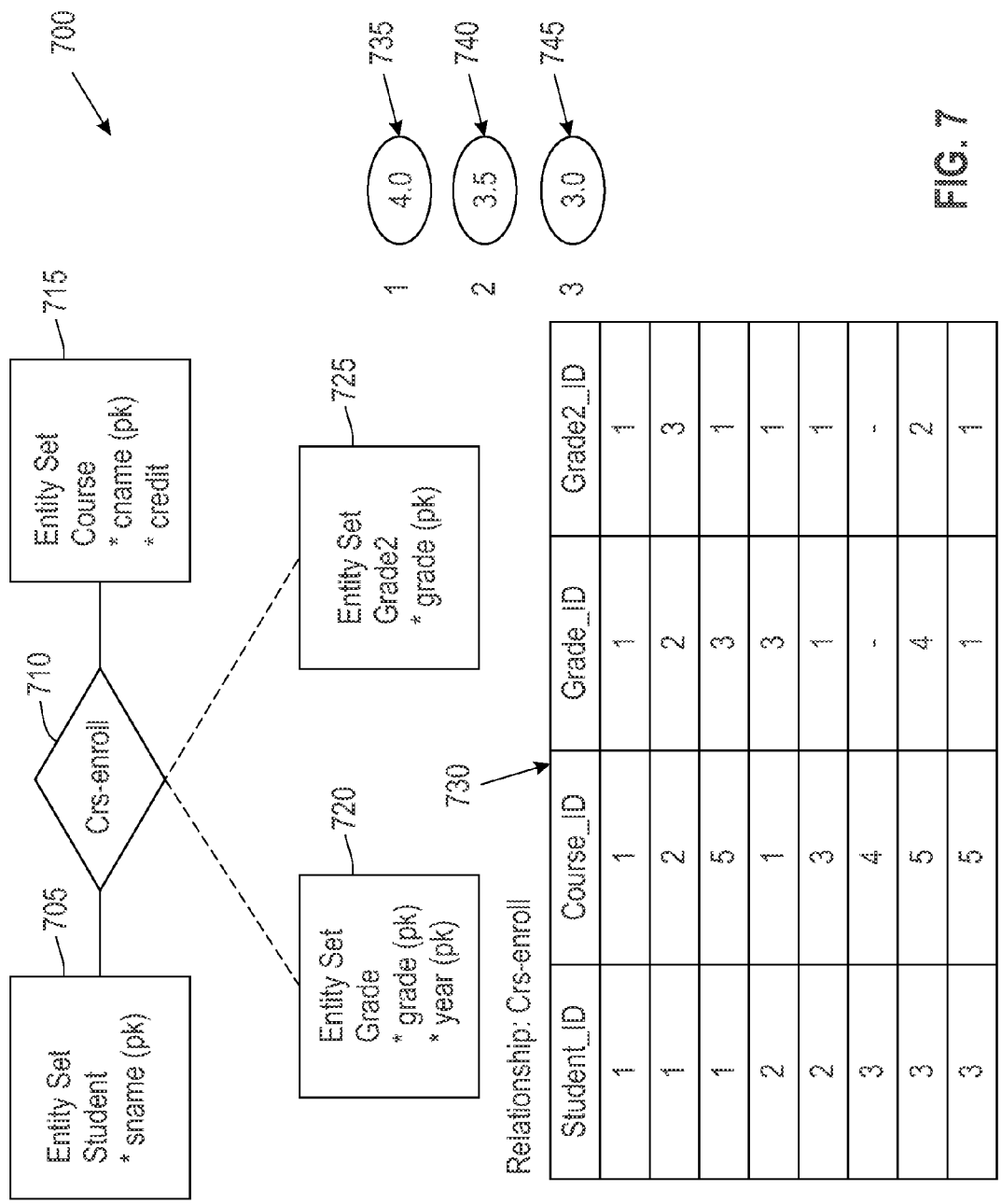
FIG. 7 is a block diagram of an exemplary embodiment of the invention after distinction.

The distinction operation in a hierarchical language of the present invention may generate a new entity set by selecting distinct values of a specified subset of attributes in an original entity set. The list of attributes of the original entity set may become the primary key attributes for the new entity set. Entities in the original entity set with the same values for attributes may be mapped to the same entity in the new entity set FIG. 7 shows an exemplary example of the present invention after distinction 700. In the distinction operation 700, Entity set Grade2 725 may be created with attribute grade. The distinct grades 4.0 (735), 3.5 (740) and 3.0 (745) are selected. Entity set Grade 720 reflects grades for a particular year, while entity set Grade2 725 does not have the year attribute, and can, for example, reflect a current grade. After the distinction operation, there may be the entities Student 705, Course 715, Grade 720, and Grade2 725. The entities may be shown with the relationship Crs-enroll 710. A table is shown at 730, giving example values for the four entities.

The aggregation operation of a hierarchical language of the present invention may, in an exemplary embodiment, have two types in the present invention: scalar aggregation and entity aggregation are separate algebra operations that may be sequentially performed. Scalar aggregation may compute a single aggregate value for a given entity set. For example, to find an aggregation of students for an entity set, the total number of students in an entity set may be computed. Entity aggregation may aggregate at the entity level. For example, for each entity in an entity set, aggregate values may be computed according to a given expression. For example, we can find the total number of courses taken by each student. For entity aggregation, an aggregate of the number of courses for each student entity may be computed.

Figure 8:
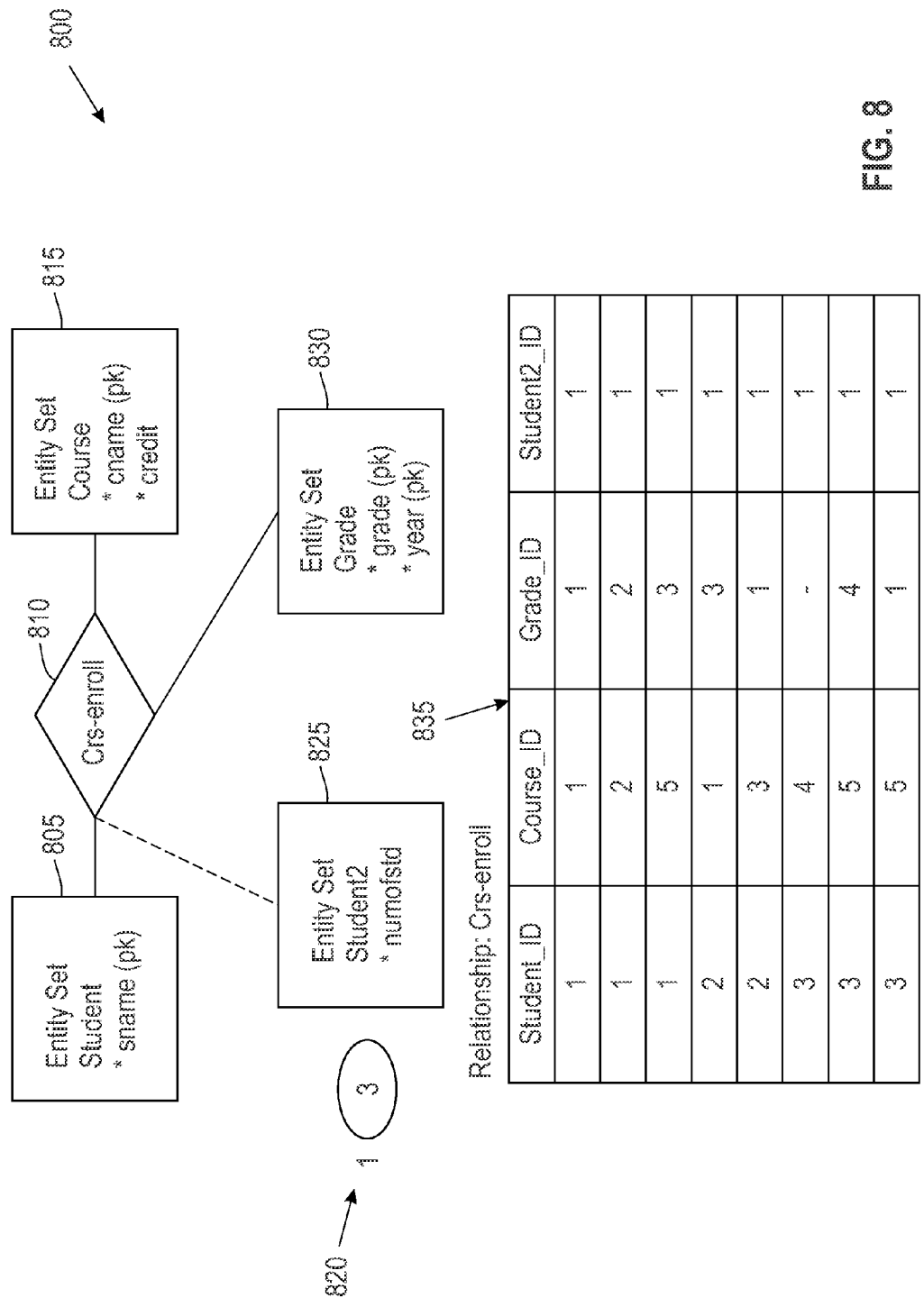
FIG. 8 is a block diagram of an exemplary embodiment of the invention after scalar aggregation.

FIG. 8 shows an exemplary embodiment of the invention after scalar aggregation 800. The entity set Student2 825 has only one entity 820 containing the total number of students. The scalar aggregation computed the total number for the entity set student. The calculated number of students is "3", as shown at 820, with a number "1" shown to the left of the oval 820 containing the number "3" indicating an ID for the calculated number of students. The other entity sets are shown as Student 805, Course 815, and Grade 830, with relationship Crs-enroll 810. A table 835 is shown with values for the entity sets.

Figure 9:
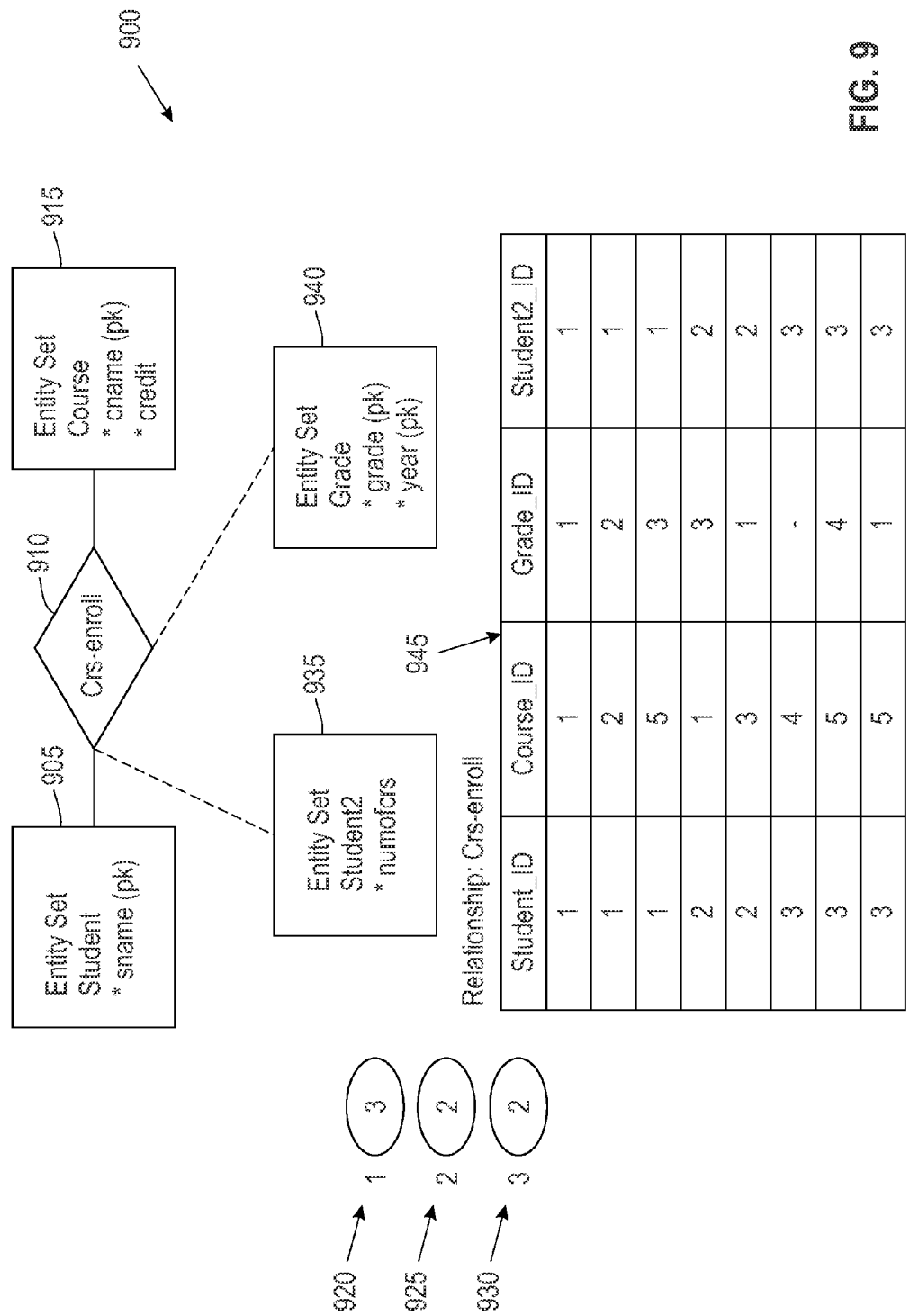
FIG. 9 is a block diagram of an exemplary embodiment of the invention after entity aggregation.

FIG. 9 shows an exemplary embodiment of the invention after entity aggregation 900. Aggregate values are computed for each entity. The entity set Student2 935 has three entities 920, 925, and 930, one for each student. Therefore, in Student2, for each of the three students, the number of courses the student is taking may be computed. For example, the entity 920 may indicate a student with student ID "1", taking three courses. As another example, the entity 925 may indicate a student with student ID "2" taking 2 courses. The other entity sets are shown as Student 905, Course 915, and Grade 940, with relationship Crs-enroll 910. A table 945 is shown with values for the entity sets.

Figure 10:
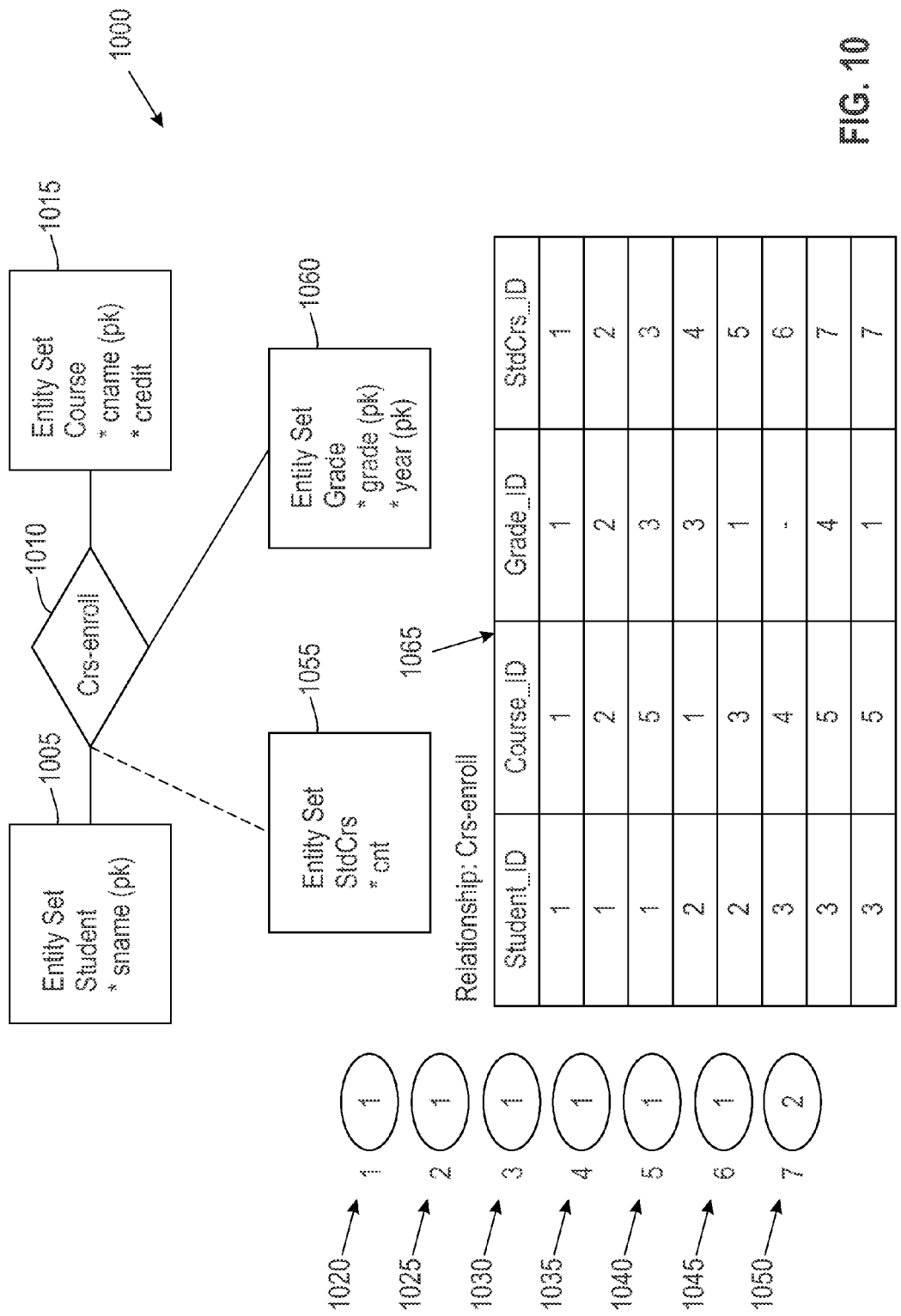
FIG. 10 is a block diagram of an exemplary embodiment of the invention after aggregation on multiple entities.

FIG. 10 shows an exemplary embodiment of the invention after aggregation 900 on two entities 1000. Aggregate values are computed for more than one entity set in a relationship set. In this example, the number of times each student took each course may be computed. The entity set StdCrs 1025 has seven entities 1020, 1025, 1030, 1035, 1040, 1045, and 1050, one for each student-course pair. Each student may take the student's selected courses only once except one student who may take the course twice, as shown at the last student-course entity 1050. The other entity sets are shown as Student 1005, Course 1015, and Grade 1060, with relationship Crs-enroll 1010. A table 1065 is shown with values for the entity sets.

The functional mergence operation of a hierarchical language of the present invention may merge two entity sets in which a first entity set has functional dependence on a second entity set. For example, functional dependence may require that in all relationships in which two entity sets share, the entity of the second entity set may determine the entity of the first entity set. The two entity sets may be functionally merged into a new entity set by combining the attributes of the two entity sets and adding the attributes to the new entity set.

Figure 11:
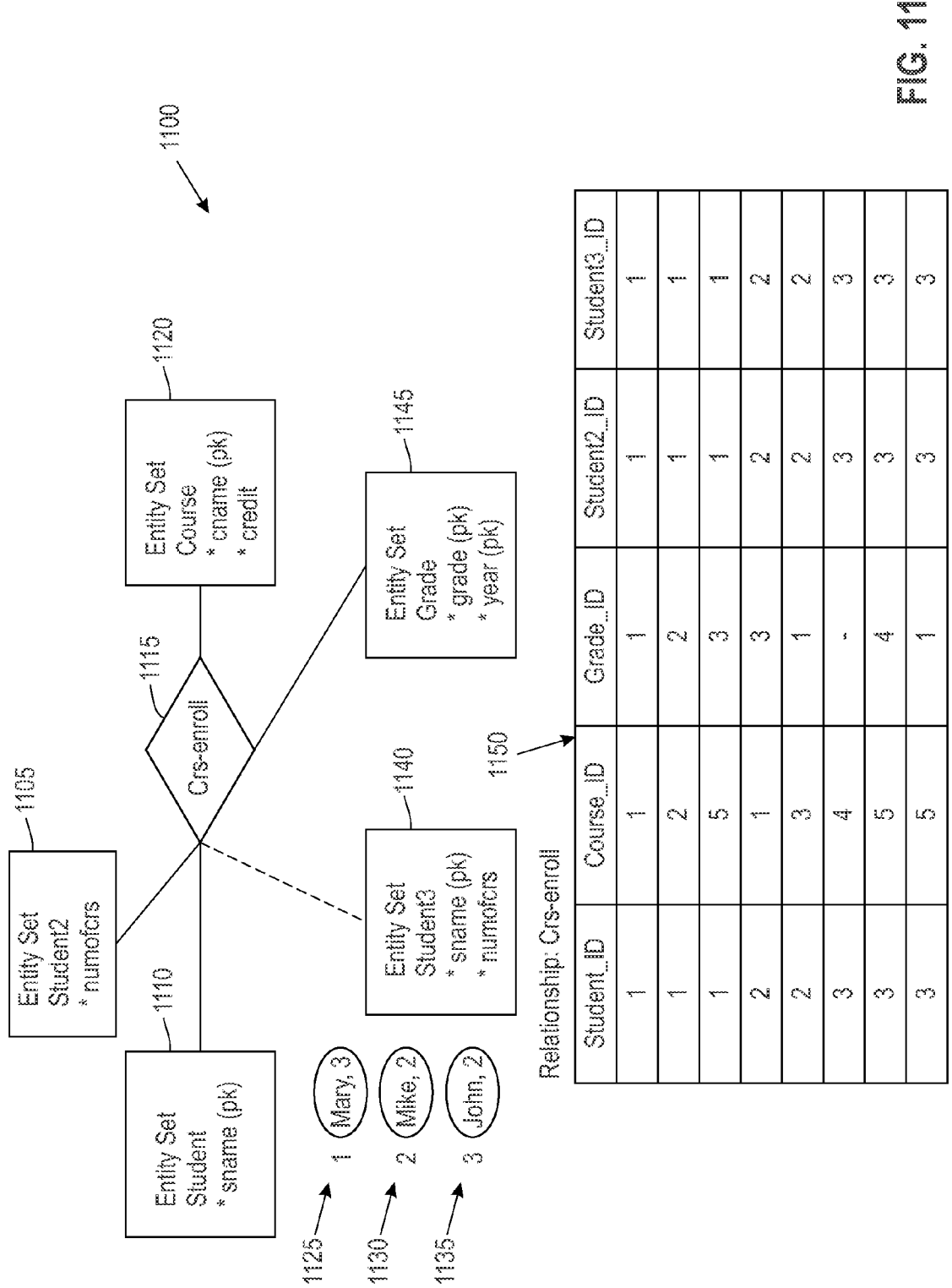
FIG. 11 is a block diagram of an exemplary embodiment of the invention after functional mergence.

FIG. 11 shows an exemplary example of the present invention after functional mergence 1100. In FIG. 11, a new entity set Student3 1140 may be created with attributes sname and numofcrs, functionally merged from entity set Student 1110 and Student2 1105. New entity set Student3 may be functionally dependent on entity set Student 1110 and entity set Student2 1105. The entity sets shown after functional mergence may be Student 1110, Student2 1105, Course 1120, Grade 1145, including newly created Student3 1140 by functional mergence. Student3 1140 may take the attribute numofcrs from entity set Student2 1105, and the attribute sname from entity set Student 1110. The relationship of the entity sets may be Crs-enroll 1115. After functional mergence, new entity set Student3 1140 contains three entities including a first entity showing Mary with three courses 1125, a second entity showing Mike with two courses 1130, and a third entity showing John with two courses 1135. An example table with data mapped to the entities is shown at 1150.

FIG. 12 shows an exemplary embodiment of the present invention using functional mergence. An example query 1210 is shown. The query can be separated into two steps as an example. First 1220, an entity aggregation on Student may compute the average grade for each student. Secondly 1230, a functional mergence of the Student entity set and the aggregation entity set in step 1 may be created.

FIG. 13 is an exemplary embodiment of the present invention showing three steps, for example, to process a query using Squery, a query language which is another invention created by the present inventors. Step 1310 may decompose the query into a sequence of algebra operations. Each level in SQuery may correspond to one or more operations. A step 1320 may process algebra operations sequentially. Operations corresponding to upper levels in Squery may be processed before the ones in lower levels. Each operation may add one or more entity sets (or relationships) into the present invention as it is being queried. Step 1330 may generate an output tree by combining the entity sets according to the hierarchy of the given SQuery.

FIG. 14 shows an exemplary example of the present invention with an example user input Squery 1410, and the example query decomposed into two operations 1420. The two operations may include, for example, retrieving the students in a particular PhD program 1430. The example query may then, for example, retrieve 1440 the EECourses taken by the retrieved students.

Figure 15:
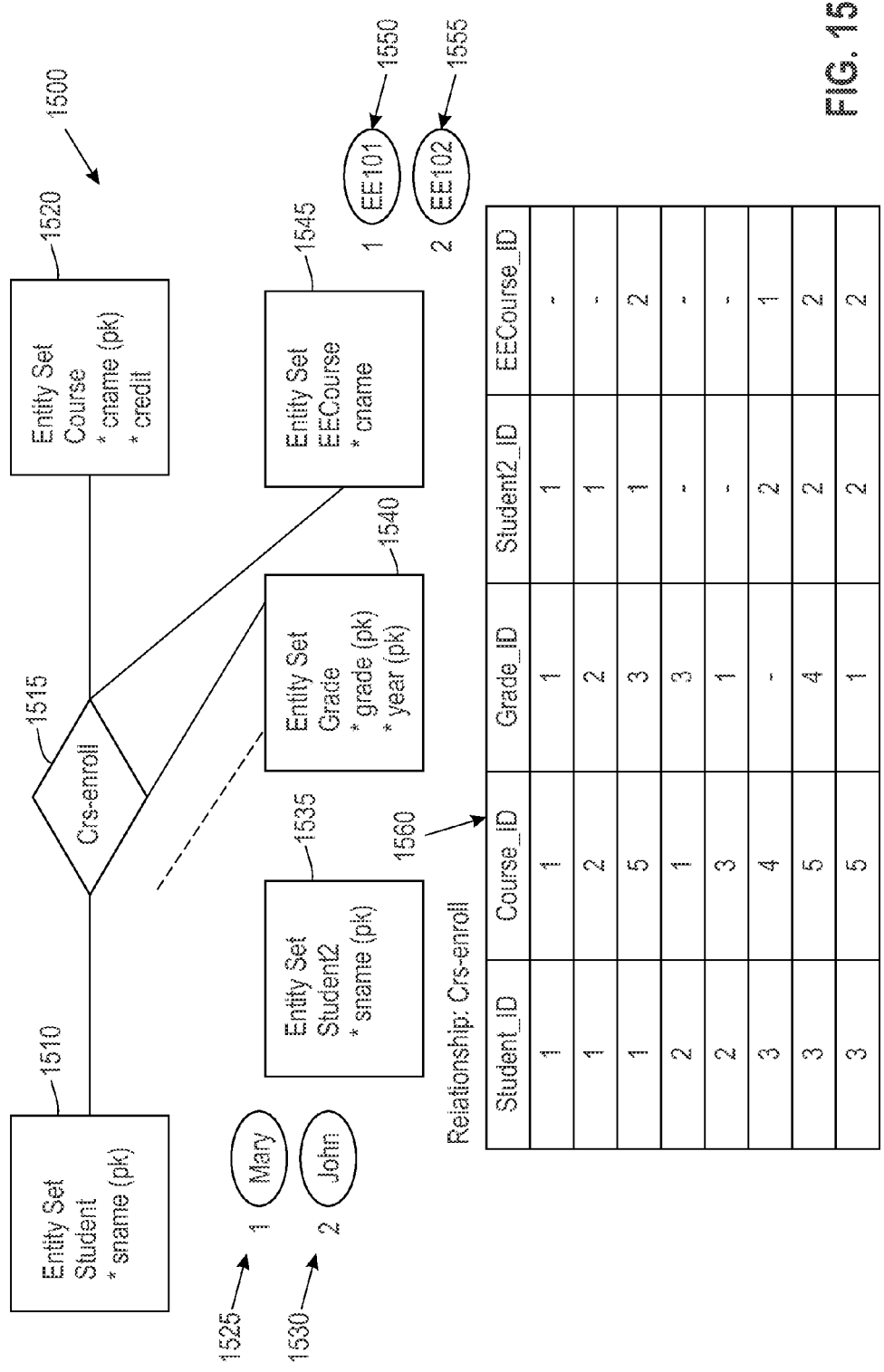
FIG. 15 is a block diagram of an exemplary embodiment of the invention showing step 2 for processing an Squery.

FIG. 15 shows an exemplary example of the present invention showing a further step 1505 in processing an Squery. A step of processing an Squery may be processed sequentially. Entity sets Student2 1535 and EECourse 1545 may be created. In processing operations, a newly created Student2 1535 may calculate and show the PhD students, and a newly created entity set EECourse 1545 may indicate those students taking EECourse. The other entity sets shown are Student 1510, Course 1520, and Grade 1540, with relationship Crs-enroll 1515. Entity set Student2 has entities Mary 1525 and John 1530, and entity set EECourse has entities EE101 1550 and EE102 1555. A table 1560 shows values for the entity sets.

Figure 16:
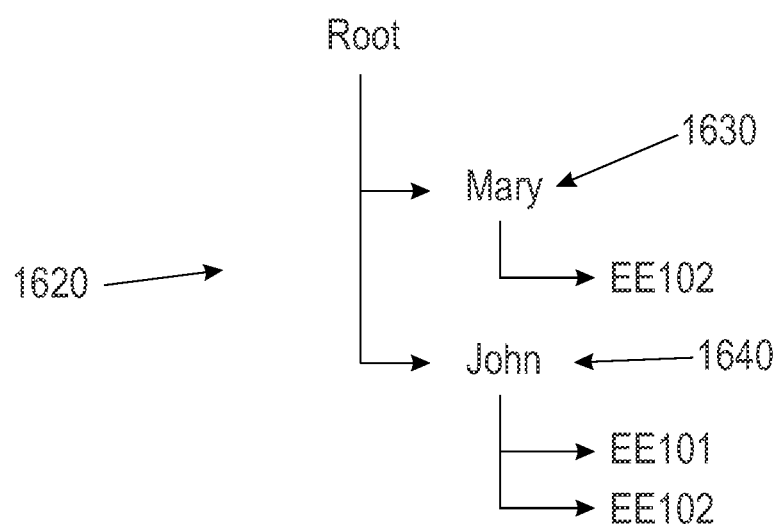
FIG. 16 shows an exemplary embodiment of the invention presenting step 3 for processing an Squery.

FIG. 16 is an exemplary example of the present invention showing a further step 1610 in processing an Squery. The tree view may be generated and returned to the user. An example resulting tree 1620 is shown. The tree shows students Mary 1630 and John 1640 and the courses they have taken.

In the present invention, relationship creation may be a further algebra operation. In relationship creation, a new relationship set between two entities is created. To specify the new relationship, the condition for joining two entities may be specified.

The atomic operations of a hierarchical query language used in the present invention may use a hierarchical path expression as an input parameter. An example of a hierarchical path expression may be a database of students, with each student taking multiple courses, and each course having a course name.

The atomic operations of a hierarchical query language in the present invention may express a set of entities and their associations as a dynamic tree structure. For example, a dynamic tree structure of a student may change if a student drops a course. As another example, a query may desire the number of students with a certain grade point average. The query may be changed for a different grade point average, and the hierarchical result may dynamically change.

The atomic operations as shown in FIGS. 5-16 of a hierarchical query language used in the present invention may include quantification, attribute comparison, and aggregation functions. Quantification may include specification of "all", "exists", or "not exists". Attribute comparison may compare an attribute to a constant or an attribute to another attribute. Attribute comparison may also use quantification. Aggregation functions may be a computation that outputs an aggregate value. For instance, an aggregate function may compute students taking more than three distinct courses.

Figure 17:
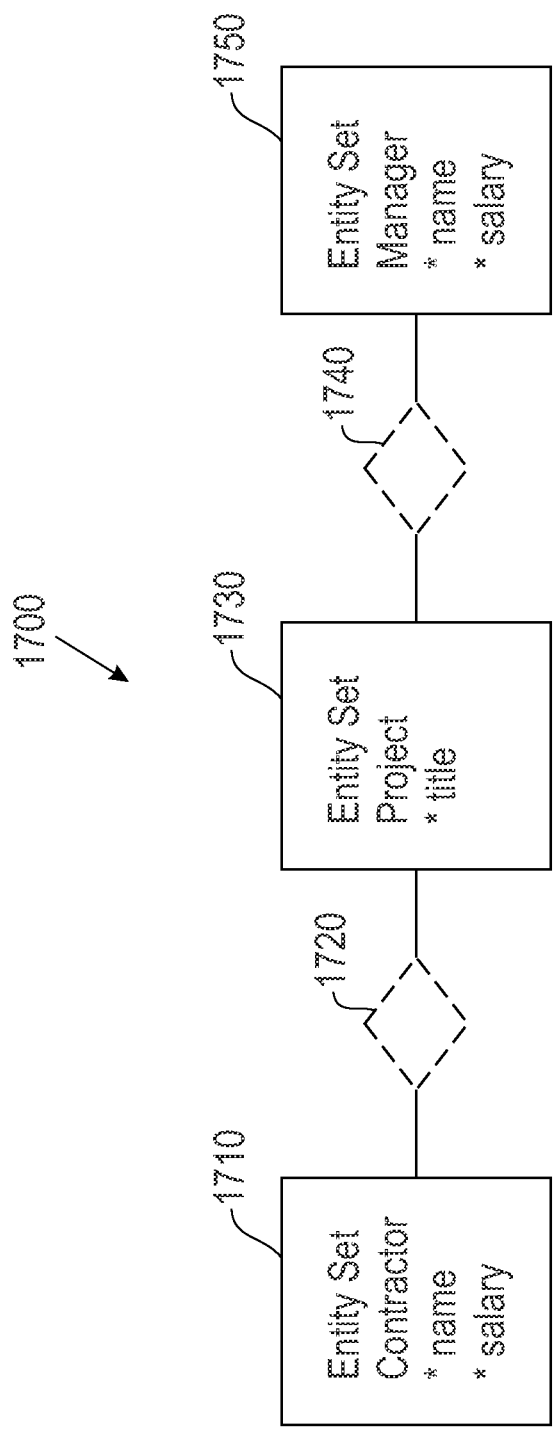
FIG. 17 is a block diagram of an exemplary embodiment of the invention showing attribute comparison.

FIG. 17 shows an exemplary embodiment of the invention showing the present invention with attribute comparison 1700. Entity sets Contractor 1710 and entity set Manager 1750 may be compared for given projects 1730. For example, the entity sets contractor and manager may be compared with attributes name and salary as shown at 1710 and 1750. The relationship diamonds 1720, 1740 indicate relationship between the three entity sets.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more performable instructions for implementing the specified logical function(s). It should also be noted that, in some alternative implementations, the functions noted in the block may occur out of the order noted in the figures. For example, two blocks shown in succession may, in fact, be performed substantially concurrently, or the blocks may sometimes be performed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be understood, of course, that the foregoing relates to exemplary embodiments of the invention and that modifications may be made without departing from the spirit and scope of the invention as set forth in the following claims.

We claim:

1. A system comprising:
a computer including a computer processor for modeling data;
a computer user interface for a user inputting a set of predefined entities, inputting a set of predefined attributes, and inputting a set of predefined relationships to represent semantic associations, with each association connecting at least two entities from the set of predefined entities;
the computer configured to create first modeled data by associating the set of predefined attributes with the set of predefined entities and not with the set of predefined relationships, wherein relationships between entities in the set of predefined entities are captured by relationship names, without using role names to represent functions of the set of predefined entities;
the computer configured to modify the first modeled data by creating partial relationships for each of the predefined relationships in the set of predefined entities, wherein the set of predefined entities has more than three of the predefined entities, wherein each of the partial relationships does not include all of the entities in the set of predefined entities;
wherein the computer uses a data modeling engine that creates the first modeled data using relationship names to represent different functions of entity sets in the set of predefined entities in at least one relationship in the set of predefined relationships, the data modeling engine employing a hierarchical query language with a set of atomic operations on the first modeled data,
wherein the hierarchical query language supports closed query operations and cross-concept queries in which the atomic operations include at least one of the following: projection, selection, union, difference, distinction, aggregation, functional mergence, functional dependence, and relationship creation, wherein the aggregation is scalar aggregation, wherein with functional dependence, an entity of a second set determines an entity of a first set;
wherein the data modeling engine is configured to output the first modeled data in visual form, including at least one of displaying the first modeled data on a display unit and printing out the first modeled data on a printer.

2. The system of claim 1, in which the aggregation atomic operation is entity aggregation.

3. The system of claim 1, wherein said set of predefined relationships does not include at least one semantic association that could be included if the first modeled data were complete.

4. The system of claim 1, in which the atomic operations use a hierarchical path expression as an input parameter.

5. The system of claim 4, in which the hierarchical path expression includes quantification.

6. The system of claim 4, in which the hierarchical path expression includes attribute comparison.

7. The system of claim 4, in which the hierarchical path expression includes aggregation functions.

* * * * *